US012607234B2

(12) United States Patent (10) Patent No.: US 12,607,234 B2
Balaraman (45) Date of Patent: Apr. 21, 2026

(54) DRIVELINE COMPONENT WITH A SELECTIVE CONNECTION ASSEMBLY

(71) Applicant: GKN Automotive Limited, Birmingham (GB)

(72) Inventor: Varadarajan Balaraman, Oxford, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/871,958

(22) PCT Filed: Nov. 15, 2022

(86) PCT No.: PCT/US2022/049891
§ 371 (c)(1),
(2) Date: Dec. 5, 2024

(87) PCT Pub. No.: WO2024/107171
PCT Pub. Date: May 23, 2024

(65) Prior Publication Data
US 2025/0334154 A1 Oct. 30, 2025

(51) Int. Cl.
*F16D 11/14* (2006.01)
*F16D 48/06* (2006.01)
(Continued)

(52) U.S. Cl.
CPC ............ *F16D 11/14* (2013.01); *F16D 48/064* (2013.01); *B60K 17/344* (2013.01);
(Continued)

(58) Field of Classification Search
CPC ............................................... F16D 2023/123
See application file for complete search history.

(56) References Cited

U.S. PATENT DOCUMENTS 9,383,008 B2 * 7/2016 Anderson ............ B60K 17/344
9,783,050 B2 * 10/2017 Brooks ..................... F16H 1/04
(Continued)

FOREIGN PATENT DOCUMENTS

WO WO2020264470 A1 12/2020
WO WO2022167678 A1 8/2022

OTHER PUBLICATIONS

International Preliminary Report on Patentability for PCT/US2022/049891 dated May 22, 2025 (7 pages).
(Continued)

*Primary Examiner* — Stacey A Fluhart
(74) *Attorney, Agent, or Firm* — Reising Ethington P.C.

(57) ABSTRACT

A driveline component with a selective connection assembly includes a first rotary component having splines, a second rotary component having splines, a coupling body arranged to be mated with the first rotary component splines and the second rotary component splines, an actuator, a drive cam and a follower cam. The drive cam is rotated about an axis by the actuator, has first and second drive surfaces both at a non-zero angle to the axis. The follower cam has first and second driven surfaces, and moves axially to move the coupling body. Rotation of the drive cam in a first direction engages the first drive and driven surfaces which moves the follower cam and coupling body in a first axial direction. Rotation of the drive cam in a second direction engages the second drive and driven surfaces which moves the follower cam and coupling body in a second axial direction.

17 Claims, 4 Drawing Sheets

(51) Int. Cl.
 *B60K 17/344* (2006.01)
 *F16D 11/00* (2006.01)

(52) U.S. Cl.
 CPC .................. *F16D 2011/002* (2013.01); *F16D 2500/1023* (2013.01); *F16D 2500/10431* (2013.01); *F16D 2500/10462* (2013.01); *F16D 2500/1107* (2013.01)

(56) References Cited

U.S. PATENT DOCUMENTS

| | | | |
|---|---|---|---|
| 11,951,826 B2 * | 4/2024 | Gebhard | ................ B60K 17/02 |
| 2015/0107954 A1 | 4/2015 | Baur et al. | |
| 2015/0321554 A1 | 11/2015 | Oram et al. | |
| 2018/0335127 A1 | 11/2018 | Wentz et al. | |
| 2019/0116735 A1 * | 4/2019 | Lang | ....................... B65B 13/26 |

OTHER PUBLICATIONS

Written Opinion & International Search Report for PCT/US2022/049891 dated Aug. 2, 2023, (10 pages).

* cited by examiner

DRIVELINE COMPONENT WITH A SELECTIVE CONNECTION ASSEMBLY

TECHNICAL FIELD

The present disclosure relates generally to a driveline component, and more particularly to a driveline component with a selective connection assembly.

BACKGROUND

Vehicle drivelines transmit torque from a vehicle's engine or motor(s) to its wheels.

Automotive drivelines sometimes include power transfer units (PTUs) for selectively distributing torque among shafts in the drivelines. The PTUs are often equipped in four-wheel drive and all-wheel drive (AWD) automotive driveline configurations. A power transfer unit typically consists of a housing that encloses and supports gears, shafts, bearings, as well as other components.

Sometimes PTUs are capable of disconnecting and reconnecting its components. The disconnected components are no longer driven to rotate and no longer transmit torque between them. These capabilities, along with other disconnected components in automotive drivelines, can preclude driven rotations in portions of the drivelines not needed to transmit torque at a particular time. For instance, on-demand AWD automotive driveline configurations do not always transmit torque among all of its shafts. Other driveline components may also selectively engage components, such as with a clutch, to enable operation in different modes or states. An example of such other driveline components is a selectively locking differential.

SUMMARY

In one implementation, a driveline component with a selective connection assembly includes a first rotary component having first rotary component splines, a second rotary component having second rotary component splines, a coupling body having coupling body splines arranged to be mated with the first rotary component splines and the second rotary component splines, an actuator, a drive cam and a follower cam. The drive cam is rotated about an axis by the actuator, has a first drive surface at a non-zero angle to the axis, and a second drive surface at a non-zero angle to the axis. The follower cam has a first driven surface and a second driven surface, and the follower cam is arranged to move axially to axially move the coupling body. Rotation of the drive cam in a first direction engages the first drive surface with the first driven surface which moves the follower cam in a first axial direction and moves the coupling body in the first axial direction. Rotation of the drive cam in a second direction engages the second drive surface with the second driven surface which moves the follower cam in a second axial direction and the coupling body in the second axial direction.

In at least some implementations, in a first position of the follower cam, the coupling body splines are mated with both the first rotary component splines and the second rotary component splines. And in a second position of the follower cam the coupling body splines are mated with the first rotary component splines but not the second rotary component splines. In at least some implementations, the follower cam and drive cam are constructed and arranged so that the actuator can be deactivated while the follower cam is in the first position and the follower cam will remain in the first position until the drive cam is rotated by the actuator to move the follower cam, and so that the actuator can be deactivated while the follower cam is in the second position and the follower cam will remain in the second position until the drive cam is rotated by the actuator to move the follower cam.

In at least some implementations, the follower cam does not rotate.

In at least some implementations, when the first drive surface is engaged with the first driven surface, the second drive surface is not engaged with the second driven surface.

In at least some implementations, the follower cam includes a transition surface that is at a different angle to the axis of rotation of the drive cam than both the first driven surface and second driven surface, and wherein, when the transition surface is contacted by the drive cam, less force is needed by the actuator to rotate the drive cam. In at least some implementations, the actuator is an electric motor the activation of which is controlled by a controller, and wherein the controller is responsive to the current draw of the motor to control the motor at least in part in response to the current draw.

In at least some implementations, the drive cam engages a surface of the follower cam at an end of rotation in one direction of rotation of the drive cam which prevents further rotation of the drive cam in that direction.

In at least some implementations, one of the first driven surface or second driven surface is defined in a flange that forms part of a channel in the follower cam, and the corresponding one of the first drive surface or second drive surface is defined in a flange that forms part of a channel in the drive cam. In at least some implementations, an end of the flange of the drive cam engages a base of the channel to prevent rotation of the drive cam in one direction. In at least some implementations, when an end of the flange of the drive cam engages a base of the channel, an end of the flange of the follower cam is received within the channel of the drive cam.

In at least some implementations, the coupling body is annular and has a first axial side and a second axial side, and wherein the follower cam includes a skirt having a first contact surface radially overlapped with the coupling body and located axially outboard of the first axial side, and the skirt has a second contact surface radially overlapped with the coupling body and located axially outboard of the second axial side. In at least some implementations, the first rotary component is driven for rotation and the second rotary component is driven for rotation only when the coupling body splines are mated with both the first rotary component splines and the second rotary component splines.

In at least some implementations, a vehicle power transfer unit with a selective connection assembly includes a first shaft having first shaft splines, a second shaft having second shaft splines, a coupling body having coupling body splines arranged to be mated with the first shaft splines and the second shaft splines, an actuator, a drive cam and a follower cam. The drive cam is rotated about an axis by the actuator, and has a first drive surface at a non-zero angle to the axis, and a second drive surface at a non-zero angle to the axis. The follower cam has a first driven surface and a second driven surface, and the follower cam is arranged to move axially to axially move the coupling body. Rotation of the drive cam in a first direction engages the first drive surface with the first driven surface which moves the follower cam in a first axial direction and moves the coupling body in the first axial direction. Rotation of the drive cam in a second direction engages the second drive surface with the second driven surface which moves the follower cam in a second axial direction and the coupling body in the second axial direction.

In at least some implementations, the first shaft is driven for rotation and the second shaft is driven for rotation only when the coupling body splines are mated with both the first shaft splines and the second shaft splines.

In at least some implementations, when the first drive surface is engaged with the first driven surface, the second drive surface is not engaged with the second driven surface.

In at least some implementations, the coupling body is annular and has a first axial side and a second axial side, and wherein the follower cam includes a skirt having a first contact surface radially overlapped with the coupling body and located axially outboard of the first axial side, and the skirt has a second contact surface radially overlapped with the coupling body and located axially outboard of the second axial side. In at least some implementations, the coupling body rotates relative to the follower cam.

Various features and components may be combined together except where they are mutually exclusive, in accordance with the description below, which is intended to illustrate the various features rather than limit the inventions described herein.

BRIEF DESCRIPTION OF THE DRAWINGS

The following detailed description of preferred embodiments and best mode will be set forth with reference to the accompanying drawings, in which.

DETAILED DESCRIPTION

Referring in more detail to the drawings, a driveline component includes a selective connection assembly to permit rotary components to be coupled together for co-rotation, or to be de-coupled so that one component rotates relative to the other. For example, a selective connection assembly 10 (FIG. 2) disconnects shafts to preclude transmitted rotation between the shafts, and re-connects the shafts to permit transmitted rotation therebetween. The connection assembly 10, and its accompanying power transfer unit (PTU) 12 (FIG. 1), are part of a larger automotive driveline. When the selection connection assembly 10 is not connected, driven rotation of certain components, such as driveline shafts and gears, does not occur when the components are not needed to transmit torque in the automotive driveline. the selective connection assembly 10 is part of installed in the PTU 12. The selective connection assembly 10 and PTU 12 can have different designs, constructions, and components than shown in FIGS. 1 and 2 and described herein, depending upon many factors, for example, the configuration of the automotive driveline, the architecture of the immediately surrounding automotive components (e.g., engine, transmission, propeller shaft), and packaging and performance demands.

Figure 1:
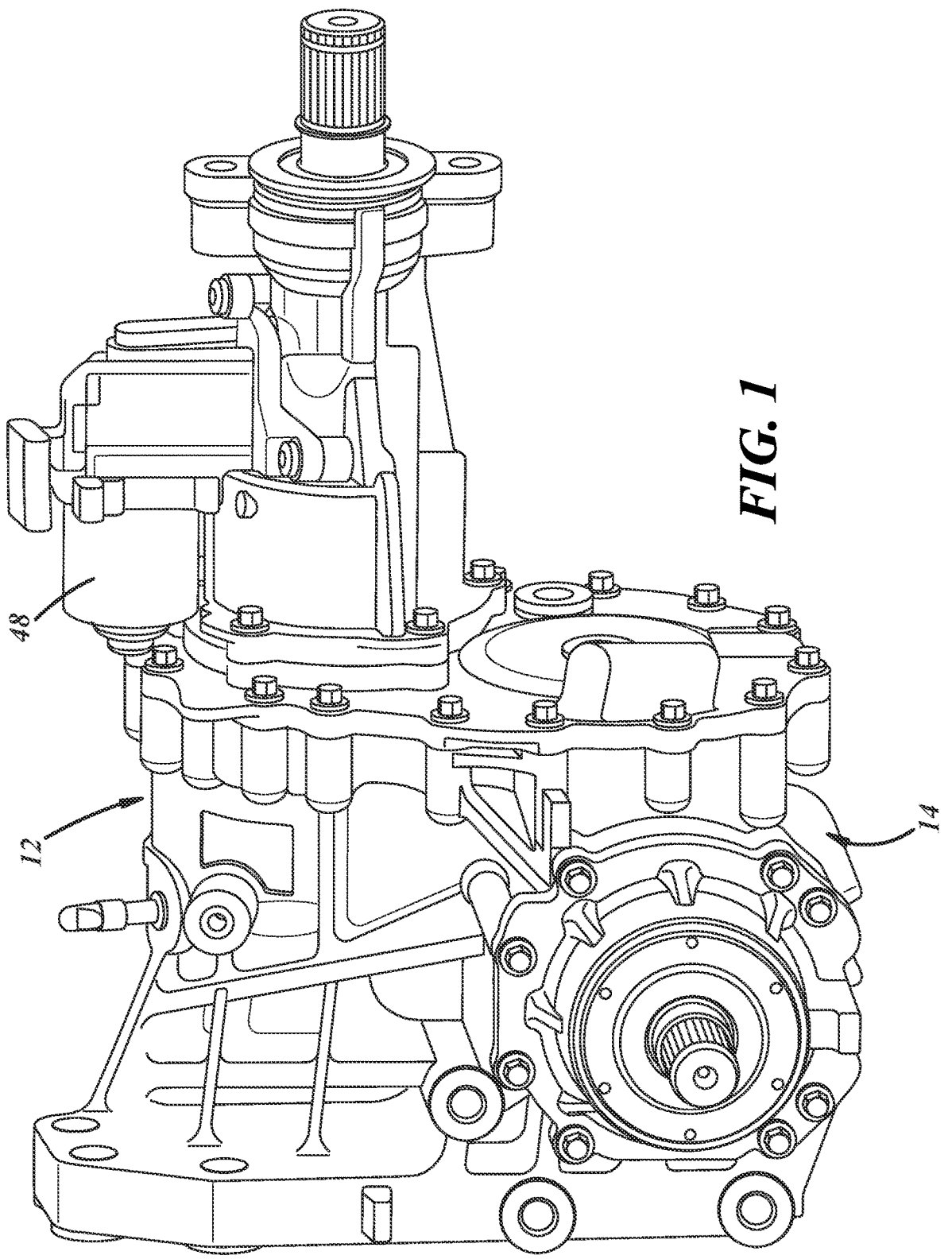
FIG. 1 is a perspective view of an embodiment of a vehicle power transfer unit (PTU) including a selective connection assembly to selectively rotate at least one shaft.
Figure 2:
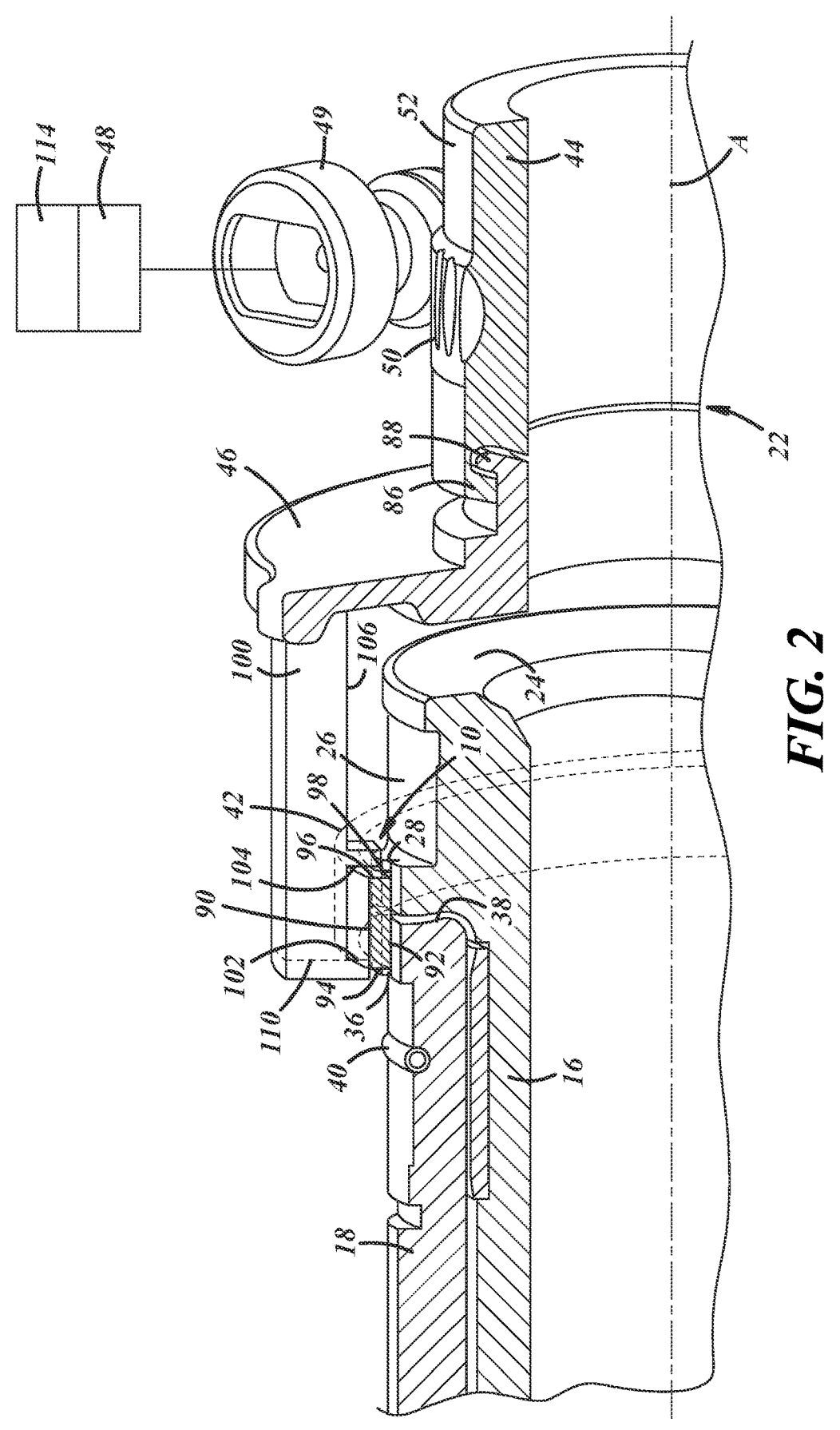
FIG. 2 is a fragmentary sectioned view of part of selective connection assembly, a first shaft and a second shaft.

Referring to FIG. 1, the PTU 12 includes a housing 14, in which are received, as shown in FIG. 2, at least part of a first shaft 16, a second shaft 18 and a cam assembly 22. The first shaft 16 can be interconnected to, and thus driven by, an upstream driveline component such as a differential shaft or gear. In this sense, the first shaft 16 can serve as an input shaft. In at least some implementations, the first shaft 16 is a hollow metal tube that rotates about an axis A when the PTU 12 is in use. As shown in FIG. 2, near an end 24 and at a radially outer surface 26, the first shaft 16 has a set of splines 28. The splines are in a circumferential array, and have an axial length and a radial depth, where the terms radial, axial and circumferential are with respect to the axis A.

The second shaft 18 is selectively connected to, and thus selectively driven by, the first shaft 16 via the selective connection assembly 10. In at least some implementations, the second shaft 18 is a hollow metal tube that radially overlaps part of the first shaft 16 at a radially outward location of the first shaft. In this sense, the second shaft 18 is a sleeve shaft that is situated around and telescopes over the first shaft 16. When connected with the first shaft 16, the second shaft 18 rotates about the axis A. The second shaft 18 has a set of splines 36 near an end 38 and on a radially outer surface 40. In at least some implementations, the splines 36 are arranged circumferentially continuously around the second shaft 18, and extend axially from the end 38 and have a radial depth.

The selective connection assembly 10 includes a cam assembly 22 and a coupling body 42. The cam assembly 22 includes a drive cam 44 and a follower cam 46. The drive cam 44 may be rotated about an axis, which may be the axis A, by an actuator to drive, via sloped cam surfaces, an axial displacement of the follower cam 46. Axial movement of the follower cam 46 moves the coupling body 42 to selectively couple or de-couple the first shaft and second shaft, as set forth in more detail below.

In at least some implementations, the actuator is an electric motor 48 that may rotate in first and second directions (e.g. clockwise and counterclockwise). The motor 48 may drive an output gear 49, the teeth of which are engaged with drive features such as teeth 50 in an exterior surface 52 of the drive cam 44. Thus, when the motor 48 rotates the output gear clockwise, the drive cam 44 rotates in a first direction, and when the motor 48 rotates the output gear 49 counterclockwise, the drive cam 44 rotates in a second direction that is opposite to the first direction. More than one gear may be provided between the motor 48 and drive cam 44, and the drive cam 44 may rotate in the same direction as the motor 48 or in a different direction.

In at least some implementations, such as is shown in FIGS. 3-10 (and labeled in FIG. 6), the drive cam 44 includes a first drive surface 54 and a second drive surface 56. FIG. 2 illustrates one implementation of the drive cam 44 and follower cam 46 as cylindrical bodies with overlapped cam surfaces, herein respectively called drive and driven surfaces, that are inclined relative to the axis A. FIGS. 3-10 illustrate portions of the drive cam 44 and follower cam 46, including the inclined cam surfaces but not in a circumferentially extending or circular arrangement. In FIGS. 3-10, a first direction of rotation of the drive cam 44 is shown by upward movement of the drive cam 44 relative to the follower cam 46, and a second direction of rotation of the drive cam 44 is shown by downward movement of the drive cam 44 relative to the follower cam 46. The upward and downward movement of the drive cam 44 simulates the inclination of drive surfaces of the drive cam 44 relative to the axis A. Thus, FIGS. 3-10 are fragmentary sectional views taken at different stages of rotation of the drive cam 44, and showing different portions of the drive surfaces in each view, and may be considered to be development of the circumferential view. In at least some implementations, the drive cam 44 rotates about an axis (axis A in the illustrated example) but does not move axially.

Figure 6:
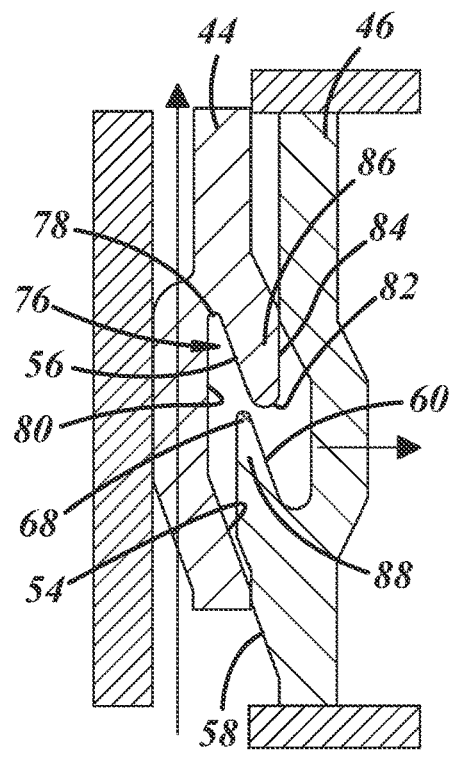
Figure 7:
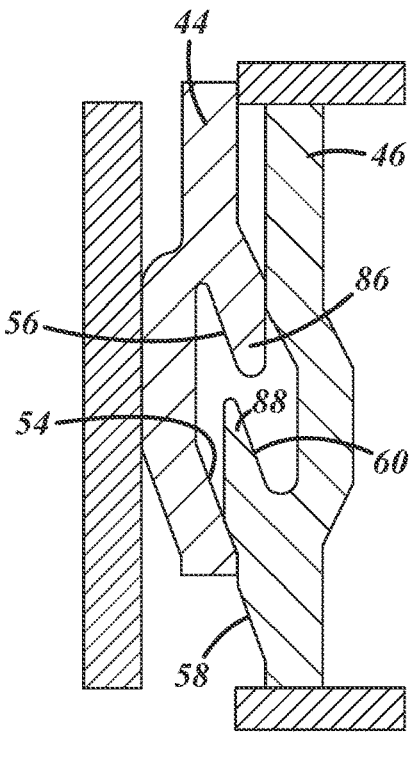

The follower cam 46 has, as labeled in FIG. 6, a first driven surface 58 and a second driven surface 60 that are alternately contacted by, respectively, the first drive surface 54 and the second drive surface 56 of the drive cam 44 as the drive cam 44 rotates. The first driven surface 58 and second driven surface 60 are inclined relative to the axis A. When the drive cam 44 rotates in a first direction, the first drive surface 54 engages the first driven surface 58 and axially displaces the follower cam 46 in a first direction. When the drive cam 44 rotates in a second direction, the second drive surface 56 engages the second driven surface 60 and axially displaces the follower cam 46 in a second direction, opposite to the first axial direction. The follower cam 46 moves axially and may be held against rotation. Thus, rotation of the drive cam 44 causes axial movement of the follower cam 46.

Between the first and second driven surfaces 58, 60, the follower cam 46 may include a transition surface 62 (labeled in FIG. 5) that is at a non-zero angle to the first driven surface 58 and which may be perpendicular to the axis A in at least some implementations. From the transition surface 62, and as labeled in FIG. 5, the follower cam 46 may include a secondary inclined surface 64 and an outward surface 66. The outward surface 66 is at a non-zero angle to the second driven surface 60, may be perpendicular to the axis A and may lead to a rounded end 68 that is joined to an outer end of the second driven surface 60. A second end of the second driven surface 60 may be defined at or join/blend with the base 70 of a channel 72, where the channel 72 is defined by the second driven surface 60, the base 70 and an inward surface 74 of the follower cam 46.

The drive cam 44 may include, as labeled in FIG. 6, a channel 76 defined by the second drive surface 56, a base 78 and an inward surface 80 of the drive cam 44. From the second drive surface 56, the drive cam 44 may include a rounded end 82 that leads to an outward surface 84, which is at a non-zero angle to the second drive surface 56 and which may be perpendicular to the axis A, or otherwise parallel to the inward surface of the follower cam 46. The inward surface 80 of the drive cam 44 may be perpendicular to the axis A or otherwise parallel to the outward surface 66 of the follower cam 46, and may transition to the first drive surface 54 which is at a non-zero angle to the inward surface, and which may be parallel to the first driven surface 58 of the follower cam 46.

So arranged, the second drive surface 56 and second driven surface 60 are on axially facing surfaces of flanges 86, 88 of the cams 44, 46, respectively, that are constructed for receipt in the channel 72, 76 of the other member. That is, in at least some positions of the assembly, the flange 86 of the drive cam 44 is received within the channel 72 of the follower cam 46, and the flange 88 of the follower cam 46 is received within the channel 76 of the drive cam 44. The flanges 86, 88 are received in the channels 72, 76 at the same time resulting in an interleaved arrangement, and the flanges are moved out of the channels at the same time, as the motor 48 drives the drive cam 44, as will be described in more detail later. The flanges 86, 88, channels 72, 76, drive surfaces 54, 56 and driven surfaces 58, 60 extend circumferentially around at least part of the drive cam 44, and preferably also the follower cam 46.

In addition to the driven surfaces 58, 60, the follower cam 46 is associated with the coupling body 42 to move the coupling body 42. In the example shown, the follower cam 46 may contact or otherwise cause movement (e.g. through an intermediate component or components) of the coupling body 42 that is formed separately from the follower cam 46, as the follower cam 46 is displaced axially. So the coupling body 42 moves axially as the follower cam 46 moves axially.

In the implementation shown in FIG. 2, coupling body 42 is an annular sleeve having a radially outer surface 90, a radially inner surface 92, and opposed first and second sides 94, 96 at axial ends of the sleeve. The coupling body 42 includes inwardly extending splines 98 formed in the inner surface 92, opposed to and arranged to mesh or mate with the splines 28, 36 on the first and second shafts 16, 18. When mated with the splines of a shaft, the coupling body 42 rotates with the shaft. In at least some implementations, the coupling body 42 axially overlaps part of the first shaft 16 and in at least one position of the follower cam 46, the coupling body 42 also axially overlaps part of the second shaft 18. In more detail, axial movement of the follower cam 46 moves the coupling body 42 axially relative to the shafts 16, 18. In a first position of the follower cam 46, the splines 98 of the coupling body 42 are meshed with both the splines 28 of the first shaft 16 and the splines 36 of the second shaft 18. In this first position, the coupling body 42 connects together the first shaft 16 and second shaft 18 for co-rotation. In a second position of the follower cam 46, the splines 98 of the coupling body 42 are meshed with the splines 28 of only the first shaft 16, so the coupling body 42 rotates with the first shaft 16 but the second shaft 18 is not rotated with the first shaft 16. The follower cam 46 is moved between these two positions by rotating the drive cam 44 in the two directions to achieve a desired connection or disconnection of the first and second shafts 16, 18.

The coupling body 42 may be annular and the splines 98 may extend circumferentially around at least a portion of the inner surface 92 of the coupling body 42. The splines 98 of the coupling body 42 extend axially a distance sufficient to overlap splines 28, 36 of both shafts 16, 18 simultaneously. The drive and driven surfaces 54, 56, 58, 60 are inclined sufficiently relative to the axis A to axially move the coupling body 42 by at least the maximum extent of overlap between the coupling body spilnes 98 and the second shaft splines 36, to permit coupling and decoupling of the coupling body 42 with the second shaft 18.

To move the coupling body 42 axially relative to the shafts 16, 18, the follower cam 46 may include, as also shown in FIG. 2, or be operably coupled to an actuating body 100. In the implementation shown, the actuating body 100 is a skirt formed in one piece with or otherwise directly connected to the follower cam 46, where the skirt 100 has opposed first and second contact surfaces 102, 104 that extend radially inwardly from an inner surface 106 of the skirt 100. The axially outer contact surface 102 is radially overlapped and axially outboard of the first side 94 of the coupling body 42, and the axially inner contact surface 104 is radially overlapped and axially outboard of the second side 96 of the coupling body 42. So arranged, movement of the follower cam 46 in a first axial direction causes the outer contact surface 102 to engage the first side 94 of the coupling body 42 to move the coupling body 42 relative to the shafts 16, 18 in the first axial direction. And movement of the follower cam 46 in a second direction causes the inner contact surface 104 to engage the second side 96 of the coupling body 42 to move the coupling body 42 relative to the shafts 16, 18 in the second axial direction. Due to the radial overlap on both sides of the coupling body 42, the actuating body 100 may be formed in two pieces, if desired, with the outer contact surface 102 defined by a ring or the like that is fixed to the skirt, as generally indicated by the dashed line 110 in FIG. 2. Further, the contact surfaces 102, 104 do not radially overlap or engage the shaft splines 28, 36, and the follower cam 46 does not rotate with the shafts or coupling body 42.

Figure 3:
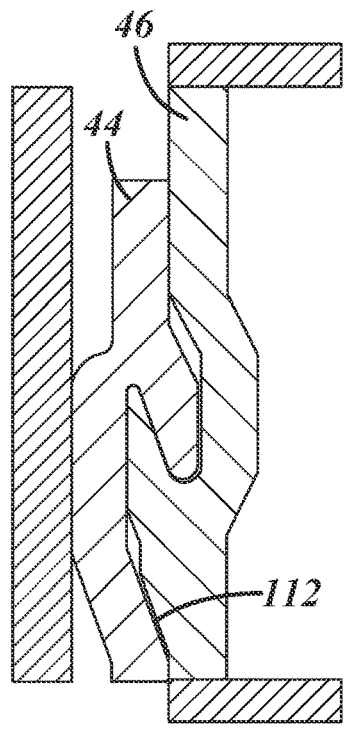
FIGS. 3-10 are diagrammatic views of portions of a drive cam and follower cam of the selective connection assembly shown in fully coupled, fully decoupled and intermediate positions.

FIGS. 3-10 illustrate the relative movement and engagement of the drive cam 44 and follower cam 46 through a full cycle of coupling and decoupling of the shafts 16, 18 (sometimes called connected and disconnected states of the driveline device). In FIG. 3, the motor 48 may be turned off and the drive cam 44 and follower cam 46 may be stationary. The flange 86, 88 of each cam is received within the channel 72, 76 of the other cam, and the ends 68, 82 of the flanges 86, 88 may be engaged with the bases 70, 78 of the channels 72, 76, if desired. In this position, the coupling body splines 98 may be meshed or in contact with the splines 28, 36 on both shafts 16, 18 so that both shafts and the coupling body 42 rotate together. This is the fully engaged or coupled state of the assembly and may represent a first position of the follower cam 46 and the drive cam 44. In at least some implementations, the assembly is stable in this position in that the drive cam 44 and follower cam 46 remain in this position even without the motor 48 acting on the drive cam 44. A small gap 112 may exist between the first drive surface 54 and first driven surface 58 so that, upon activation of the motor 48 in a first direction (e.g. clockwise), the drive cam 44 rotates slightly relative to the follower cam 46 and the motor 48 does not experience significant resistance upon first rotary movement.

Figure 4:
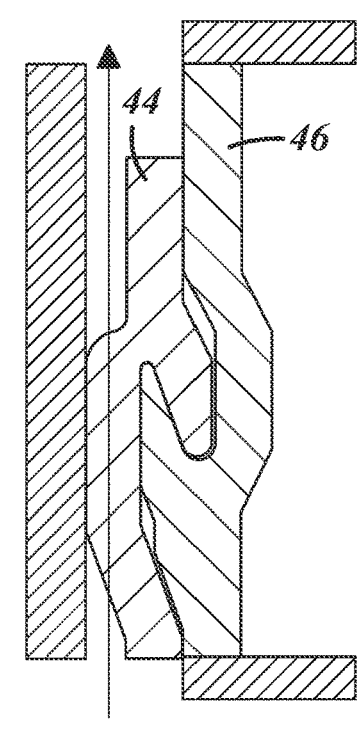
Figure 5:
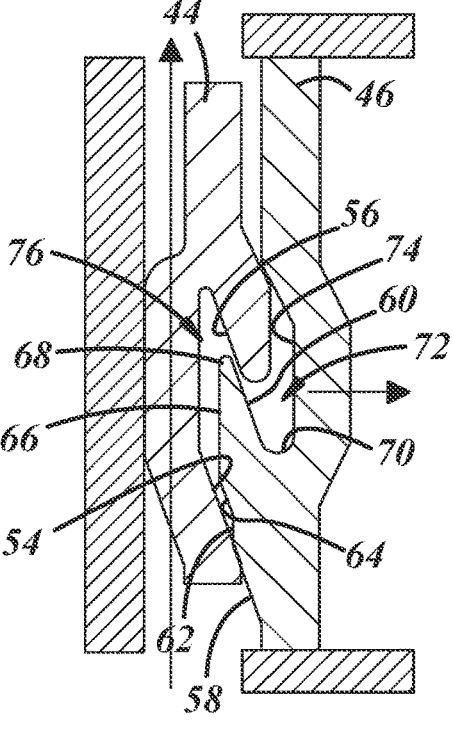

In FIG. 4, the gap 112 no longer is present due to rotation of the drive cam 44 relative to the follower cam 46 and the first drive surface 54 is now in contact with the first driven surface 58. FIG. 5 shows the cams 44, 46 after further rotation of the drive cam 44 after which the follower cam 46 has been displaced axially, which moves the coupling body 42 in a first axial direction (e.g. away from the drive cam 44). In FIG. 6, the drive cam 44 has been rotated further and the first drive surface 54 is no longer in contact with the first driven surface 58. Instead, a portion of the first drive surface 54 is adjacent to the transition surface 62. Rotation of the drive cam 44 with the first drive surface 54 adjacent to the transition surface 62 requires less force because movement of the drive cam 44 in this region causes less or no axial displacement of the follower cam 46.

A controller 114 (FIG. 2) used to activate/deactivate the motor 48 may be responsive to the motor current and could determine from a decreased motor current due to the reduction in force needed to rotate the drive cam 44, that the drive cam 44 no longer is driving the follower cam 46. When the first drive surface 54 passes the transition surface 62, an increased motor current may be detected as the first drive surface 54 engages the secondary inclined surface 64 and this may be detected by the controller 114 due to an increase in motor torque needed to rotate the drive cam 44. This series of transitions may indicate that the cams 44, 46 are now decoupled (the drive surfaces are not engaged with the driven surfaces, and the flanges are moved out of the channels), and the motor 48 may be deactivated to maintain this position of the cams 44, 46. In this position, the coupling body 42 is axially positioned such that the splines 98 overlap the splines 28 on the first shaft 16, but not on the second shaft 18. In this way, the second shaft 18 is not driven for rotation and the shafts 16, 18 are decoupled.

To return the assembly to the coupled state, the motor 48 is activated for rotation in the second direction (e.g. counterclockwise). From the position shown in FIG. 7, initial rotation of the drive cam 44 due to motor rotation in this direction, causes the first drive surface 54 to move back over the transition surface 62 and that movement, when the transition surface 62 is perpendicular to the axis A, does not cause axial movement of the follower cam 46, and so requires less motor torque than when the follower cam 46 is displaced.

Figure 8:
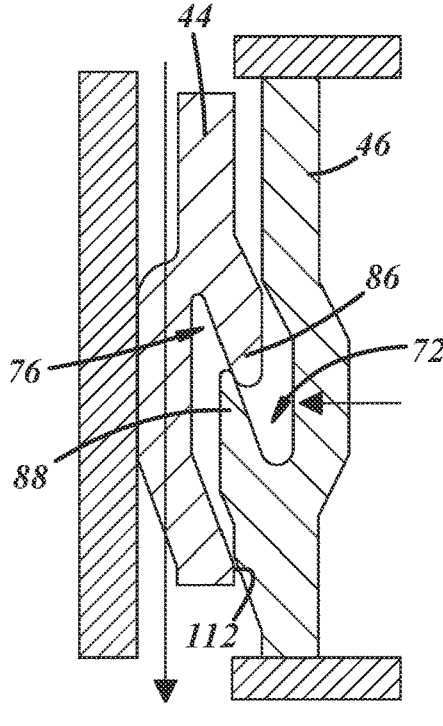
Figure 9:
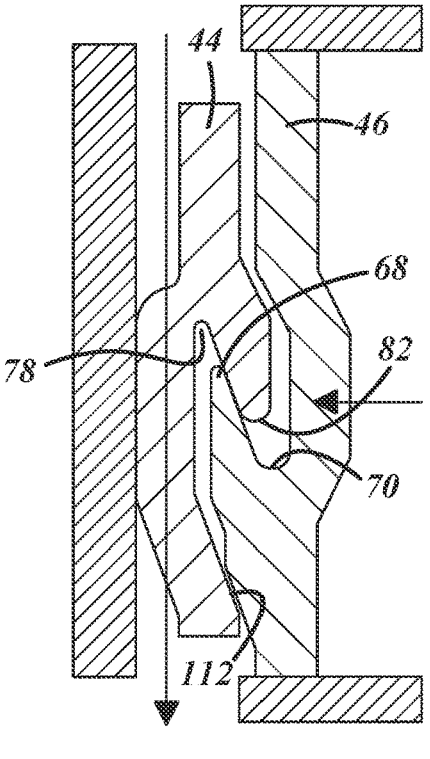
Figure 10:
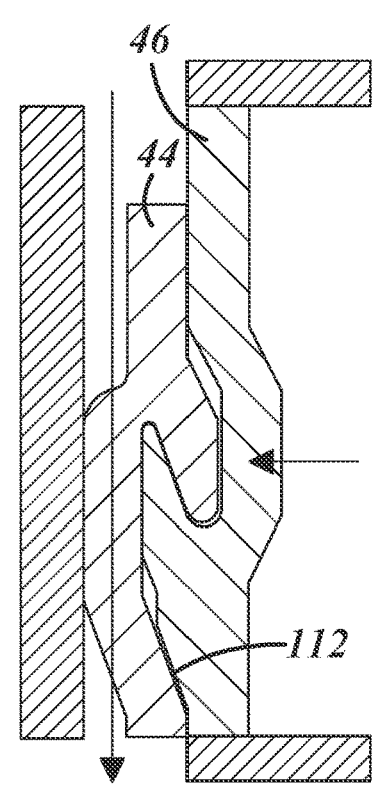

In the position shown in FIG. 8, the second drive surface 56 initially engages the second driven surface 60, and the gap 112 again exists between the first drive surface 54 and first driven surface 58. Thus, contact between the cams 44, 46 is at the interface between the second drive surface 56 and second driven surface 60. Continued rotation of the drive cam 44 in this direction causes increasing overlap of the second drive surface 56 with the second driven surface 60, as shown by comparison of FIGS. 8, 9 and 10, and the gap 112 remains. This movement causes axial movement of the follower cam 46 in a direction that moves the coupling body 42 in a second axial direction (e.g. toward the drive cam 44), which increasingly overlaps again the coupling body splines 98 with the splines 36 of the second shaft 18. The position shown in FIG. 10 is the same as the position shown in FIG. 3. When the assembly reaches this position, further rotation of the motor 48 in the second direction would be resisted by the engagement of at least one of the flanges 86, 88 in its respective channel 72, 76 such that the controller 114 could determine from an increased motor current due to the contact between the cams 44, 46, that the cams are fully mated. From this determination, the motor 48 may be turned off and the cams 44, 46 may remain in this position until such time as the motor 48 is activated to rotation again in the first direction.

In operation, the selective connection assembly 10 disconnects the first and second shafts 16, 18 to preclude transmitted rotation from the first shaft 16 to the second shaft 18, and re-connects the first and second shafts to permit transmitted rotation therebetween. The disconnect/re-connect functionality can be managed by an electronic control unit (ECU).

While described with reference to the figures, the PTU disconnect assembly can be designed and constructed in different ways than depicted. Moreover, the term splines is used broadly to also encompass teeth and other similar structures that are capable of mating and unmating to transmit rotation. Further, while described with reference to coupling or decoupling shafts in the PTU, the selective connection assembly can be used in other applications, for example to move and cause engagement and disengagement of a clutch, for example by moving a dog clutch member relative to another member, where the dog cutch member acts as a coupling body 42. Still further, the positive driving of the coupling body may be achieved with a drive screw (e.g. lead screw or ball screw) driven in both directions, or other linear actuator driven in both directions. Of course, other arrangements may be used in accordance with the disclosure provided herein.

While the forms of the disclosure constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the invention.

The invention claimed is:

1. A driveline component with a selective connection assembly, comprising:

a first rotary component having first rotary component splines;

a second rotary component having second rotary component splines;

a coupling body having coupling body splines arranged to be mated with the first rotary component splines and the second rotary component splines;

an actuator;

a drive cam rotated about an axis by the actuator, the drive cam having a first drive surface at a non-zero angle to the axis, and a second drive surface at a non-zero angle to the axis;

a follower cam having a first driven surface and a second driven surface, and the follower cam being arranged to axially move the coupling body, and wherein rotation of the drive cam in a first direction engages the first drive surface with the first driven surface which moves the follower cam in a first axial direction and moves the coupling body in the first axial direction, and wherein rotation of the drive cam in a second direction engages the second drive surface with the second driven surface which moves the follower cam in a second axial direction and the coupling body in the second axial direction, wherein the follower cam includes a transition surface that is at a different angle to the axis of rotation of the drive cam than both the first driven surface and second driven surface, and wherein, when the transition surface is contacted by the drive cam, less force is needed by the actuator to rotate the drive cam.

2. The driveline component of claim 1 wherein in a first position of the follower cam, the coupling body splines are mated with both the first rotary component splines and the second rotary component splines, and in a second position of the follower cam the coupling body splines are mated with the first rotary component splines but not the second rotary component splines.

3. The driveline component of claim 2 wherein the follower cam and drive cam are constructed and arranged so that the actuator can be deactivated while the follower cam is in the first position and the follower cam will remain in the first position until the drive cam is rotated by the actuator to move the follower cam, and so that the actuator can be deactivated while the follower cam is in the second position and the follower cam will remain in the second position until the drive cam is rotated by the actuator to move the follower cam.

4. The driveline component of claim 1 wherein the follower cam does not rotate.

5. The driveline component of claim 1 wherein, when the first drive surface is engaged with the first driven surface, the second drive surface is not engaged with the second driven surface.

6. The driveline component of claim 1 wherein the actuator is an electric motor the activation of which is controlled by a controller, and wherein the controller is responsive to the current draw of the motor to control the motor at least in part in response to the current draw.

7. The driveline component of claim 1 wherein the drive cam engages a surface of the follower cam at an end of rotation in one direction of rotation of the drive cam which prevents further rotation of the drive cam in that direction.

8. The driveline component of claim 7 wherein the actuator is an electric motor the activation of which is controlled by a controller, and wherein the controller is responsive to the current draw of the motor to control the motor at least in part in response to the current draw.

9. The driveline component of claim 1 wherein the coupling body is annular and has a first axial side and an opposite second axial side, and wherein the follower cam includes a skirt having a first contact surface radially overlapped with the coupling body and located axially outboard of the first axial side, and the skirt has a second contact surface radially overlapped with the coupling body and located axially outboard of the second axial side.

10. The driveline component of claim 1 wherein the first rotary component is driven for rotation and the second rotary component is driven for rotation only when the coupling body splines are mated with both the first rotary component splines and the second rotary component splines.

11. The driveline component of claim 1 wherein the first rotary component is a first shaft that is driven for rotation and the second rotary component is a second shaft that is driven for rotation only when the coupling body splines are mated with both the splines of the first shaft and the splines of the second shaft.

12. The driveline component of claim 1 wherein the coupling body rotates relative to the follower cam.

13. A driveline component with a selective connection assembly, comprising:

a first rotary component having first rotary component splines;

a second rotary component having second rotary component splines;

a coupling body having coupling body splines arranged to be mated with the first rotary component splines and the second rotary component splines;

an actuator;

a drive cam rotated about an axis by the actuator, the drive cam having a first drive surface at a non-zero angle to the axis, and a second drive surface at a non-zero angle to the axis;

a follower cam having a first driven surface and a second driven surface, and the follower cam being arranged to axially move the coupling body, and wherein rotation of the drive cam in a first direction engages the first drive surface with the first driven surface which moves the follower cam in a first axial direction and moves the coupling body in the first axial direction, and wherein rotation of the drive cam in a second direction engages the second drive surface with the second driven surface which moves the follower cam in a second axial direction and the coupling body in the second axial direction, wherein the drive cam engages a surface of the follower cam at an end of rotation in one direction of rotation of the drive cam which prevents further rotation of the drive cam in that direction, and wherein the actuator is an electric motor the activation of which is controlled by a controller, and wherein the controller is responsive to the current draw of the motor to control the motor at least in part in response to the current draw.

14. A driveline component with a selective connection assembly, comprising:

a first rotary component having first rotary component splines;

a second rotary component having second rotary component splines;

a coupling body having coupling body splines arranged to be mated with the first rotary component splines and the second rotary component splines;

an actuator;

a drive cam rotated about an axis by the actuator, the drive cam having a first drive surface at a non-zero angle to the axis, and a second drive surface at a non-zero angle to the axis;

a follower cam having a first driven surface and a second driven surface, and the follower cam being arranged to axially move the coupling body, and wherein rotation of the drive cam in a first direction engages the first drive surface with the first driven surface which moves the follower cam in a first axial direction and moves the coupling body in the first axial direction, and wherein rotation of the drive cam in a second direction engages the second drive surface with the second driven surface which moves the follower cam in a second axial direction and the coupling body in the second axial direction, wherein one of the first driven surface or second driven surface is defined in a flange that forms part of a channel in the follower cam, and the corresponding one of the first drive surface or second drive surface is defined in a flange that forms part of a channel in the drive cam.

15. The driveline component of claim 14 wherein an end of the flange of the drive cam engages a base of the channel to prevent rotation of the drive cam in one direction.

16. The driveline component of claim 15 wherein, when an end of the flange of the drive cam engages a base of the channel, an end of the flange of the follower cam is received within the channel of the drive cam.

17. The driveline component of claim 15 wherein the actuator is an electric motor the activation of which is controlled by a controller, and wherein the controller is responsive to the current draw of the motor to control the motor at least in part in response to the current draw.

* * * * *